Oct. 20, 1953  L. T. SANDERS  2,655,779
MARINE GROWTH HARVESTER
Filed May 10, 1949

*INVENTOR.*
L. T. SANDERS
BY
*A. Yates Dowell*
ATTORNEY

Patented Oct. 20, 1953

2,655,779

UNITED STATES PATENT OFFICE 2,655,779

MARINE GROWTH HARVESTER

Leslie T. Sanders, Palatka, Fla.

Application May 10, 1949, Serial No. 92,453

4 Claims. (Cl. 56—9)

This invention relates to harvesters and more particularly to an apparatus specifically designed to remove and destroy certain types of marine growth, particularly water hyacinths.

Marine growth such as water hyacinths has become a very troublesome problem in many of our inland water ways particularly in the South, and in many instances have developed to such an extent that navigation has been seriously impeded. Various attempts have been made to remove or destroy these marine growths and these have included merely tearing or cutting the growths, removing and burning the same or merely removing the material for transportation and disposal at some remove point. Merely cutting or tearing up the marine growth has not proved satisfactory in view of the fact that the material continues to float on the water and constitute a navigational hazard and also this floating material continues to grow, thereby aggravating the condition rather than alleviating it. While the apparatus for removing and burning the marine growth was probably satisfactory from the standpoint of destroying the same, nevertheless this apparatus is extremely cumbersome both to manufacture and operate, and consequently did not present a practical answer to the problem and these same objections apply to removing and transporting the growth for disposition at a remote point.

It is accordingly an object of this invention to provide a relatively simple marine growth harvester which may be conveniently adjusted for removing the growth at various depths and which will completely remove the material and finely comminute the same for discharge back into the water.

It is a further object of the invention to provide a marine growth harvester which is relatively simple in construction, which is self-powered and which may be conveniently and efficiently operated by one man since all of the controls necessary to operate the device are centrally located in a convenient position.

Figure 1:
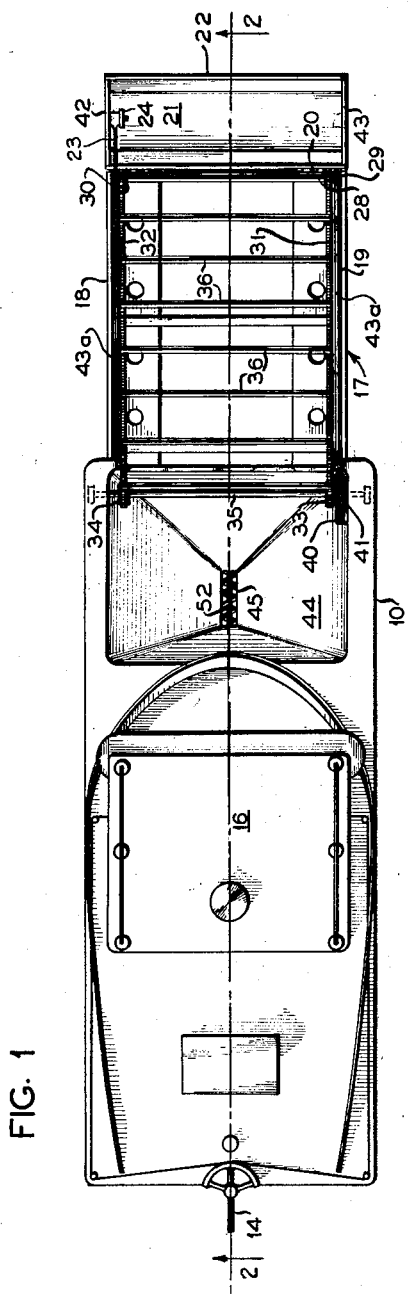
Figure 2:
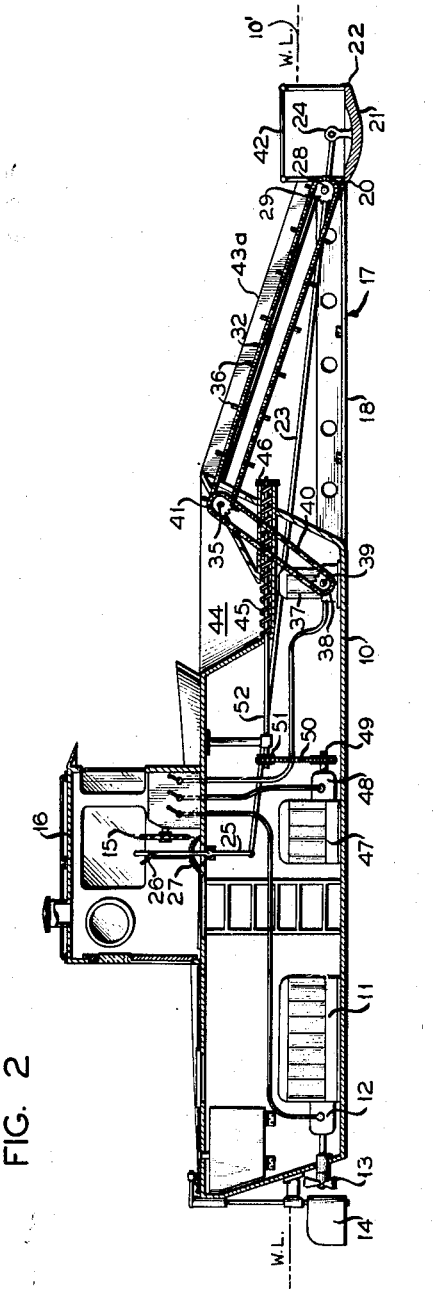

Further objects and advantages of the invention will be apparent from the following description taken in conjunction with the accompanying drawings, wherein:

Fig. 1 is a top plan view of the apparatus of this invention; and,

Fig. 2, a longitudinal sectional view taken generally on the line 2—2 of Fig. 1 showing the water line and showing the internal construction of the boat supporting the harvesting apparatus as well as the arrangement of the various mechanisms which go to make up the invention and illustrating the conveyor driving chain in the foreground.

With continued reference to the drawing, there is shown a boat 10 of the familiar square ended scow type, which is particularly advantageous for this type of work in that the boat is very stable and yet will float in relatively shallow water as indicated by water line 10'. The boat 10 used in connection with this invention may be especially constructed for the purpose or may be easily adapted from conventional scow type boats. Propelling means is provided in the form of an internal combustion engine 11 connected through a clutch and reverse gear 12 to a propeller 13. The boat is steered by a conventional rudder 14 controlled from a wheel 15 located in a pilot house 16 positioned substantially midships, in order to afford adequate visibility for navigation of the boat and operation of the harvesting apparatus.

The harvesting apparatus comprises a boom 17 which may conveniently consist of a pair of beams 18 and 19 attached to the bow of the boat adjacent the bottom thereof and extending forwardly of the boat for an appreciable distance. At the forward end of the boom there is pivotally mounted at 20 a scoop 21 having a forward edge 22. The scoop 21 may be adjustably positioned for operating at various depths by rods 23 pivotally secured to the scoop at 24 and secured at the opposite ends to an adjusting lever 25 located in the pilot house and having a hand controlled ratchet 26 engaging a quadrant 27 for securely locking the scoop in any desired adjusted position.

Rotatably mounted adjacent the forward end of the boom 17 is a laterally disposed shaft 28 on which is mounted a pair of spaced sprockets 29 and 30 which receive conveyor chains 31 and 32 respectively. These conveyor chains also pass over sprockets 33 and 34 mounted on a cross shaft 35 rotatably supported on the boat adjacent the forward end thereof. Chains 31 and 32 are connected by a series of cleats or slats 36 which serve to form an endless conveyor. This conveyor is driven by an internal combustion engine 37 through a clutch 38, sprocket 39 and drive chain 40 engaging a sprocket 41 mounted on shaft 35. In order to direct marine growth which has been collected by scoop 21 onto the conveyor formed by slats 36, upstanding end walls or the like 42 and 43 may be provided adjacent each end of the scoop 21 in order that the material moving rearwardly from the edge 22 will engage the conveyor slats 36 rather than drop off the ends of the scoop 21. The material is prevented from dropping off the sides of the conveyor by upstanding side boards 43a disposed adjacent the ends of slats 36.

In order to dispose of the marine growth collected by scoop 21 there is provided adjacent the inner ends of the conveyor chains 31 and 32 a hopper 44 into which the material is discharged. This hopper serves to feed the material to a worm type conveyor 45 disposed adjacent the bottom thereof which forces the material through chopping knives 46 similar to those used in the conventional meat chopper. These knives serve to finely divide or comminute the material and discharge the same overboard into the water and since this material is so finely divided it does not in any way constitute a hazard to navigation and will not continue to grow as in the case of marine growth which is merely pulled up by the roots.

The worm type conveyor 45 and chopping knives 46 are driven by an internal combustion engine 47 through a clutch 48, sprocket 49 and drive chain 50 engaging a sprocket 51 mounted on shaft 52 fixed to the conveyor 45.

The controls for the main propulsion motor, the conveyor drive motor 37 and the chopper motor 47 are all located in the pilot house 16 at a point convenient to the operator in order that all of the various mechanisms may be adequately controlled from a single location.

In operation it is only necessary to set the scoop 21 and edge 22 at the desired depth by manipulation of adjusting lever 25 and propel the boat forward by motor 11 and propeller 13 whereupon any marine growth in the path of the scoop 21 will be collected, the material moving rearwardly to be deposited on conveyor slats 36. The material is carried rearwardly and upwardly to be dumped into hopper 44 after which it is engaged by the conveyor 45 leading to chopper knives 46 which finely comminute the material and deposit the same overboard.

It is seen that by the above described invention there is provided a relatively simple marine growth harvester which may be economically and simply constructed from parts commonly available in shipyards and the like and which may be constructed of sufficiently heavy material to prevent damage due to contact with underwater objects without imparting excessive weight to the apparatus. This invention also serves to efficiently collect all marine growth in the path of movement thereof and to chop this material to sufficient fineness that it may be discharged overboard without impeding navigation or without danger of regrowth thereof.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A marine growth harvester comprising a boat having a water line adapted to float on a body of water, a beam secured on each side of the boat and extending forwardly thereof with the forward end located below the water line, a forwardly extending scoop positioned with its bottom below the water line pivotally mounted for movement about a horizontal axis at its rear end to the forward ends of the beams, a conveyor mounted on the boat and extending forwardly and downwardly to the rear end of the scoop below the water line, and power means operatively connected to the conveyor for operating the conveyor whereby water hyacinths collected by the scoop may be raised from the water.

2. The invention according to claim 1 and means on the boat for controlling the position of the pivotal scoop, and means interconnecting said controlling means on the boat and the scoop for pivotally adjusting the scoop.

3. The invention according to claim 1 and a hopper mounted on the boat adjacent the rear end of the conveyor for receiving material from the conveyor, and means in communication with the hopper for receiving and chopping the collected material.

4. The invention according to claim 3 and a control for the conveyor power means, and individually controllable power means for the chopping means and for propelling the boat whereby the operator may select the most efficient operation of the harvester.

LESLIE T. SANDERS.

References Cited in the file of this patent

UNITED STATES PATENTS

| Number | Name | Date |
| --- | --- | --- |
| 898,501 | Pederson | Sept. 15, 1908 |
| 1,080,144 | Ennis | Dec. 2, 1913 |
| 1,398,454 | Daniels | Nov. 29, 1921 |
| 1,533,644 | Gebhardt | Apr. 14, 1925 |
| 1,795,003 | Allen | Mar. 3, 1931 |
| 1,839,380 | Druppel | Jan. 5, 1932 |
| 2,181,863 | Bell | Dec. 5, 1939 |